United States Patent
Gyotoku

(10) Patent No.: US 10,742,886 B2
(45) Date of Patent: Aug. 11, 2020

(54) IMAGE SHAKE CORRECTION DEVICE, CONTROL METHOD THEREFOR, AND IMAGING APPARATUS

(71) Applicant: CANON KABUSHIKI KAISHA, Tokyo (JP)

(72) Inventor: Takashi Gyotoku, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 20 days.

(21) Appl. No.: 15/955,845

(22) Filed: Apr. 18, 2018

(65) Prior Publication Data

US 2018/0309930 A1  Oct. 25, 2018

(30) Foreign Application Priority Data

Apr. 24, 2017 (JP) .................. 2017-085211

(51) Int. Cl.
  *H04N 5/232* (2006.01)
  *H04N 5/225* (2006.01)
  (Continued)

(52) U.S. Cl.
  CPC ........... *H04N 5/23264* (2013.01); *G01P 3/36* (2013.01); *G02B 7/14* (2013.01); *G02B 27/646* (2013.01); *G06T 5/003* (2013.01); *H04N 5/2254* (2013.01); *H04N 5/23209* (2013.01); *H04N 5/23212* (2013.01); *H04N 5/23216* (2013.01); *H04N 5/23254* (2013.01); *H04N 5/23258* (2013.01); *H04N 5/23261* (2013.01); *H04N 5/23287* (2013.01); *H04N 5/23296* (2013.01); *G06T 2207/20201* (2013.01)

(58) Field of Classification Search
  CPC ............ H04N 5/23264; H04N 5/2254; H04N 5/23296; H04N 5/23212; H04N 5/23216; G02B 7/14; G01P 3/36
  See application file for complete search history.

(56) References Cited

U.S. PATENT DOCUMENTS

2017/0013198 A1* 1/2017 Wada .................. G06T 5/20

FOREIGN PATENT DOCUMENTS

JP  2016-136242 A  7/2016

* cited by examiner

*Primary Examiner* — Twyler L Haskins
*Assistant Examiner* — Angel L Garces-Rivera
(74) *Attorney, Agent, or Firm* — Cowan, Liebowitz & Latman, P.C.

(57) ABSTRACT

In an imaging apparatus, an interchangeable lens can be mounted on a body. The interchangeable lens includes a lens angular velocity sensor and acquires angular velocity information regarding shake. A camera body includes a camera angular velocity sensor in which an offset is smaller than in the lens angular velocity sensor to acquire angular velocity information. A motion vector detection unit detects a motion vector based on a plurality of frame images. An object angular velocity calculation unit performs a process of extracting an object using angular velocity information and a motion vector by the camera angular velocity sensor and calculates an angular velocity of the object by the imaging apparatus from the angular velocity information by the lens angular velocity sensor. A camera control unit and a lens control unit perform image blur correction control of the object during exposure using the calculated angular velocity of the object.

15 Claims, 14 Drawing Sheets

(51) Int. Cl.
*G01P 3/36* (2006.01)
*G02B 7/14* (2006.01)
*G02B 27/64* (2006.01)
*G06T 5/00* (2006.01)

IMAGE SHAKE CORRECTION DEVICE, CONTROL METHOD THEREFOR, AND IMAGING APPARATUS

BACKGROUND OF THE INVENTION

Field of the Invention

The present invention relates to an image shake correction device that corrects image shake, a control method therefor, and an imaging apparatus.

Description of the Related Art

Panning is a photographic technique for expressing a sense of lively motion of an object, and the technique involves photographing a moving object at a slower shutter speed than usual while tracking the object. Since an image in which the background flows and the object is stopped can be obtained, a photo full of a sense of speed can be taken. However, since long-exposure photography is performed in panning, it is difficult for a beginner to match a movement speed of an object with a speed at which a camera is moving during an exposure period.

To simply realize panning, Japanese Patent Laid-Open No. 2016-136242 discloses a method of detecting a difference between a movement speed of an object and a speed at which a camera moves and correcting a shake amount equivalent to the difference in the speed by moving the shift lens. Immediately before photography, an angular velocity of the camera tracking the object with respect to the panning is detected by an angular velocity sensor in the camera and a motion vector is simultaneously detected from an image of an imaging surface. A process of separating vectors of a main object and a background from motion vectors and the angular velocity of the panning and calculating an angular velocity of the object from the motion vector of the main object is performed. By correcting a difference between a speed of the main object and a panning speed of the camera by moving a shift lens in accordance with a difference amount between the calculated angular velocity of the main object and an angular velocity sensor output in the camera during exposure, it is possible to suppress image shake of the main object which is a panning target. Hereinafter, a function of supporting the panning is referred to as "panning assist."

Here, it is important to more accurately obtain an angular velocity of the object, that is, an angular velocity when a photographer performs a panning operation on the camera with a motion of the object, to stop an image of the object aimed by the photographer. When an error occurs in the angular velocity, an error occurs in image shake correction performed using the shift lens. There is a possibility of the error appearing as a shake residual in the image.

In the technology of the related art disclosed in Japanese Patent Laid-Open No. 2016-136242, when an offset is added to an output from a shake detection unit, a difference between a speed of the main object and a panning speed of the camera deviates according to the offset. Therefore, a shake residual appears in the image. The shake residual is caused due to a possibility of a large offset component being added to a detected output since there is drift and an offset occurring due to a variation in an individual difference, a temperature change, or the like in the case of an angular velocity sensor generally used to detect shake.

SUMMARY OF THE INVENTION

According to the present invention, it is possible to calculate an angular velocity of an object using angular velocity information regarding shake and a motion vector and correct image blur of the object with high precision.

According to an embodiment of the present invention, there is provided an image shake correction device in which blur of an image of an object imaged by an image sensor through an imaging optical system is corrected by an image blur correction unit includes a correction lens. The image blur correction device includes an acquisition unit configured to acquire angular velocity information regarding shake detected by a plurality of detectors and acquire a motion vector calculated from a plurality of images captured by the image sensor; and a control unit configured to perform control such that image blur of the object is suppressed by the image blur correction unit. The control unit specifies the object using the motion vector and first or second angular velocity information among a plurality of pieces of the angular velocity information, calculates an angular velocity of the object with respect to the image blur correction device using the second angular velocity information, and controls the image blur correction unit.

Further features of the present invention will become apparent from the following description of exemplary embodiments with reference to the attached drawings.

DESCRIPTION OF THE EMBODIMENTS

First to third examples of a preferred embodiment of the present invention will be described. In each example, a lens interchangeable imaging system in which a lens device is mounted on a camera body as an imaging apparatus that has a correction function related to object shake and camera shake will be described.

First Example

Figure 1:
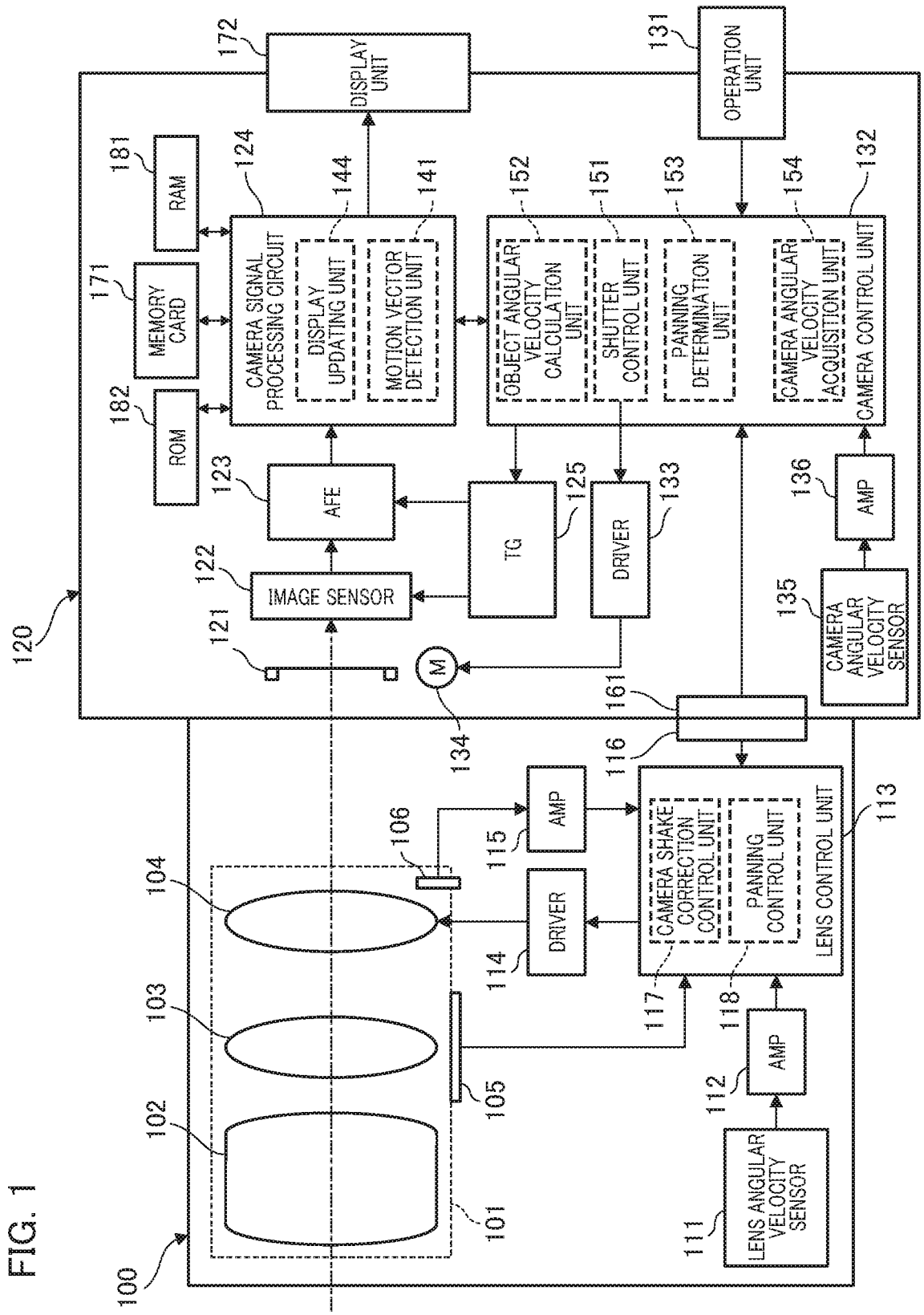
FIG. 1 is a block diagram illustrating an example of a configuration of an imaging apparatus according to an embodiment.

FIG. 1 is a block diagram illustrating an example of a configuration of an imaging apparatus according to an embodiment. An example of the imaging system including an interchangeable lens 100 and a camera body 120 will be described. A photographic lens unit 101 of the interchangeable lens 100 includes a main imaging optical system 102, a zoom lens group 103 capable of changing a focal distance, and a shift lens group 104. The shift lens group (hereinafter also simply referred to as a shift lens) 104 is a correction lens group that is moved in a direction perpendicular to an optical axis. The shift lens group 104 optically corrects image shake (image blur) with respect to the optical axis due to shake of the imaging apparatus by changing a position at which light from an object is formed as an image.

The interchangeable lens 100 includes a zoom encoder 105, a position sensor 106, and a lens angular velocity sensor 111. The zoom encoder 105 detects a position of the zoom lens group 103. The position sensor 106 detects a position of the shift lens group 104. The lens angular velocity sensor 111 is an example of a shake detection unit that detects shake of the interchangeable lens 100 and outputs a shake detection signal. An amplifier 112 amplifies an output from the lens angular velocity sensor 111.

A lens control unit 113 includes a microcomputer for lens system control. The lens control unit 113 controls driving of the shift lens group 104 through a driver 114. The amplifier 115 amplifies an output from the position sensor 106 of the shift lens group 104 and outputs a position detection signal to the lens control unit 113.

The interchangeable lens 100 includes a mount contact unit 116 connected to a mount contact unit 161 of the camera body 120. The lens control unit 113 includes first and second control units. The first control unit is a camera shake correction control unit 117 that performs camera shake correction control. The second control unit is a panning control unit 118 that performs control for panning assist. The lens control unit 113 additionally performs focus adjustment control, aperture control, or the like by moving a focus lens, which will be omitted to simplify the drawings. In the camera shake correction by the camera shake correction control unit 117, for example, shake is detected and corrected with regard to two orthogonal axes, for example, in the horizontal direction and the vertical direction. Since a configuration is the same with regard to the two axes, only one axis will be described.

The camera body 120 includes a shutter 121 controlling an exposure time. The image sensor 122 is, for example, a complementary metal oxide semiconductor (CMOS) type image sensor, and receives light from an object formed as an image through an imaging optical system and outputs an electric signal through photoelectric conversion. The analog signal processing circuit (AFE) 123 processes the signal output by the image sensor 122 and supplies the processed signal to the camera signal processing circuit 124.

The camera signal processing circuit 124 includes a motion vector detection unit 141 and a display updating unit 144, and a memory card 171, a random access memory (RAM) 181, and a read-only memory (ROM) 182 are connected. The motion vector detection unit 141 detects a motion of an object based on an output signal from the image sensor 122. The display updating unit 144 updates display of a live-view image at a predetermined updating interval. A display unit 172 includes a display device such as a liquid crystal panel displaying an image. A timing generator (TG) 125 sets an operation timing of the image sensor 122 or the analog signal processing circuit 123.

An operation unit 131 includes a power switch, a release switch, and a selector switch. The release switch is an operation switch in which a first switch (referred to as an SW1) is turned on in a half-push operation of the release button and a second switch (referred to as an SW2) is turned on in a full-push operation. In accordance with an SW1 signal at the time of the half-push operation, a photography preparation operation such as an automatic focus adjustment (AF) process, an automatic exposure (AE) process, and a flash dimming (EF) process, or the like starts. In accordance with an SW2 signal at the time of the full-push operation, a series of photography operations such as imaging, developing, and recording starts. A user operates the selector switch so that a panning assist mode in which panning is supported can be set.

A camera control unit 132 includes a microcomputer for camera system control and controls each constituent unit of the imaging system. The camera control unit 132 includes a shutter control unit 151, an object angular velocity calculation unit 152, a panning determination unit 153, and a camera angular velocity acquisition unit 154. The shutter control unit 151 controls a shutter driving motor 134 through a driver 133 to control an operation of the shutter 121. The object angular velocity calculation unit 152 calculates an angular velocity of a main object. The main object is a primary object specified from a plurality of objects. The panning determination unit 153 performs a panning determination process. The camera angular velocity acquisition unit 154 acquires angular velocity detection information regarding shake of the camera body 120. A camera angular velocity sensor 135 detects an angular velocity of the shake of the camera body 120 and the amplifier 136 amplifies an output from the camera angular velocity sensor 135. The camera angular velocity acquisition unit 154 acquires an angular velocity detection signal from the amplifier 136.

The memory card 171 is a recording medium that records a signal of an imaged video. The display unit 172 performs monitor display of an image which the user intends to image with the camera and displays the imaged image on a screen.

The camera body 120 includes a mount contact unit 161 with the interchangeable lens 100. The lens control unit 113 and the camera control unit 132 perform serial communication at a predetermined timing via the mount contact units 116 and 161.

In the imaging system of FIG. 1, when the user operates the power switch of the operation unit 131 to power on the camera, the camera control unit 132 detects a state change. The camera control unit 132 performs power supply and initial setting on each circuit of the camera body 120. When power is supplied to the interchangeable lens 100, the lens control unit 113 performs initial setting inside the interchangeable lens 100. After the camera control unit 132 and the lens control unit 113 enter a communicable state, communication between the camera control unit 132 and the lens control unit 113 starts at a predetermined timing. In communication from the camera control unit 132 to the lens control unit 113, a camera state, photography setting information, and the like are transmitted. In communication from the lens control unit 113 to the camera control unit 132, focal distance information, angular velocity information, and the like of the interchangeable lens 100 are transmitted.

The user can change the normal mode and the panning assist mode by operating the selector switch of the operation unit 131. The normal mode is a mode in which the panning assist mode is not set. When the panning assist mode is set, the camera control unit 132 is switched to the control for the panning assist. When information indicating that the panning assist mode is set is transmitted from the camera control unit 132 to the lens control unit 113, the lens control unit 113 transitions to the panning assist mode.

The camera body 120 in the panning assist mode performs a process of detecting a motion vector from video information imaged at a given frame rate. The motion vector detection unit 141 in the camera signal processing circuit 124 outputs data of the detected motion vector of the object to the camera control unit 132. Simultaneously, the camera control unit 132 receives lens angular velocity data detected by the lens angular velocity sensor 111 in the interchangeable lens 100 from the lens control unit 113. The camera angular velocity acquisition unit 154 in the camera control unit 132 acquires camera angular velocity data detected by the camera angular velocity sensor 135. Further, the camera signal processing circuit 124 temporarily outputs the image data obtained by performing a development process on the video information to the RAM 181. The display updating unit 144 in the camera signal processing circuit 124 updates display of the live-view image by reading the image data on the RAM 81 at an updating interval corresponding to a synchronous signal and outputting the image data to the display unit 172.

The lens angular velocity data received from the interchangeable lens 100 and the camera angular velocity data acquired by the camera angular velocity sensor 135 correspond to a panning speed of the imaging apparatus together. When a difference between a movement amount on an image surface of the main object and an angular velocity calculated from a current focal distance of the interchangeable lens 100 is calculated for any angular velocity data, the calculation result corresponds to object angular velocity data of the main object with respect to the imaging apparatus. The camera control unit 132 transmits the calculated object angular velocity data of the main object to the lens control unit 113.

In the camera control unit 132, the panning determination unit 153 can integrate the lens angular velocity data received from the lens control unit 113 and the camera angular velocity data acquired from the camera angular velocity sensor 135 and retain the integrated data as angular data. The panning determination unit 153 can also reset the retained integrated data at a predetermined timing. Thus, when the user performs panning, angular displacement of the camera obtained using the predetermined timing as the origin can be acquired.

Figure 2:
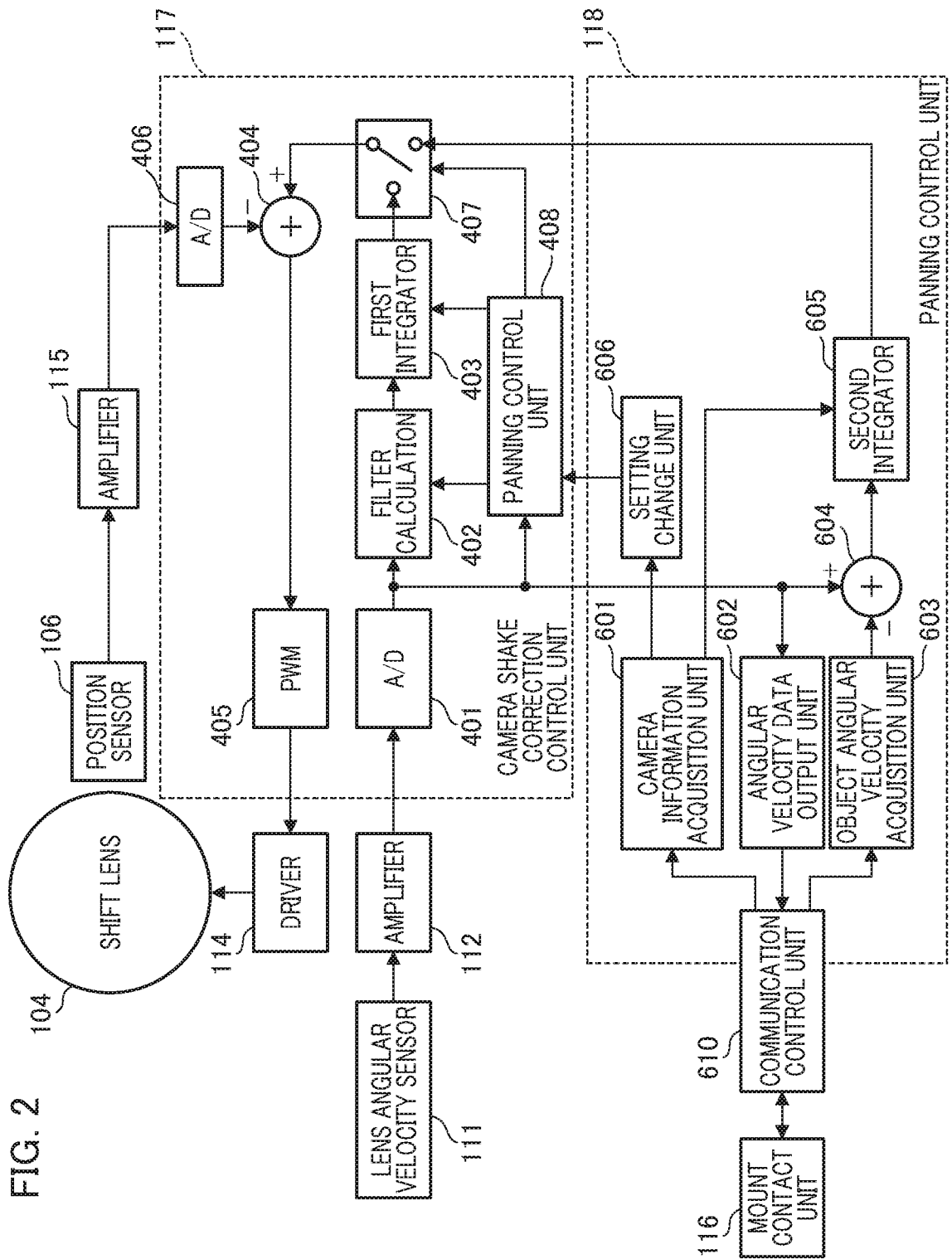
FIG. 2 is a diagram illustrating a configuration for camera shake correction control and panning control according to the embodiment.

FIG. 2 is a diagram illustrating a configuration for driving control of the shift lens in the interchangeable lens 100. Configurations common to FIG. 1 will be given the reference numerals used therein and the detailed description thereof will be omitted.

First, a configuration of the camera shake correction control unit 117 will be described. The A/D converter 401 acquires a shake signal detected by the lens angular velocity sensor 111 from the amplifier 112 and converts the shake signal from an analog signal to a digital signal. A data sample of an output from the lens angular velocity sensor 111 is performed at 1 to 10 kHz. A filter calculation unit 402 includes a highpass filter (HPF). The filter calculation unit 402 performs a process for panning countermeasures of removing an offset component contained in the output from the lens angular velocity sensor 111 and changing a cutoff frequency. A first integrator 403 acquires angular velocity data output by the filter calculation unit 402, integrates the angular velocity data to generate a driving target data of the shift lens, and converts the angular velocity data into angular displacement data. An output from the first integrator 403 is transmitted to a switch unit 407.

An A/D converter 406 acquires an output from the amplifier 115 and converts a position detection signal from the position sensor 106 into digital data. An adder 404 sets the output from the switch unit 407 to a positive input and an output from the A/D converter 406 as a negative input, and performs an adding process. That is, actual driving data of the shift lens is calculated by subtracting a current shift lens position from a driving target value of the shift lens. In the present specification, the adder is assumed to perform subtraction as addition of a negative value. A PWM output unit 405 acquires an output from the adder 404 and outputs driving amount data calculated through a pulse width modulation process to the driver 114 for shift lens driving.

The switch unit 407 selects an output from the first integrator 403 or an output from a second integrator 605 to be described below and switches data to be output to the adder 404. A panning control unit 408 acquires an output from the A/D converter 401 and determines whether a camera panning operation is performed from a state of the angular velocity data. When it is determined that the panning operation is performed, the panning control unit 408 performs change control of the cutoff frequency of the filter calculation unit 402 and output adjustment of the first integrator 403. In the example, the panning control will be described. The same applies to tilting control except for a difference in a photography direction. An example of the panning control will be described with reference to the flowchart of FIG. 3.

Figure 3:
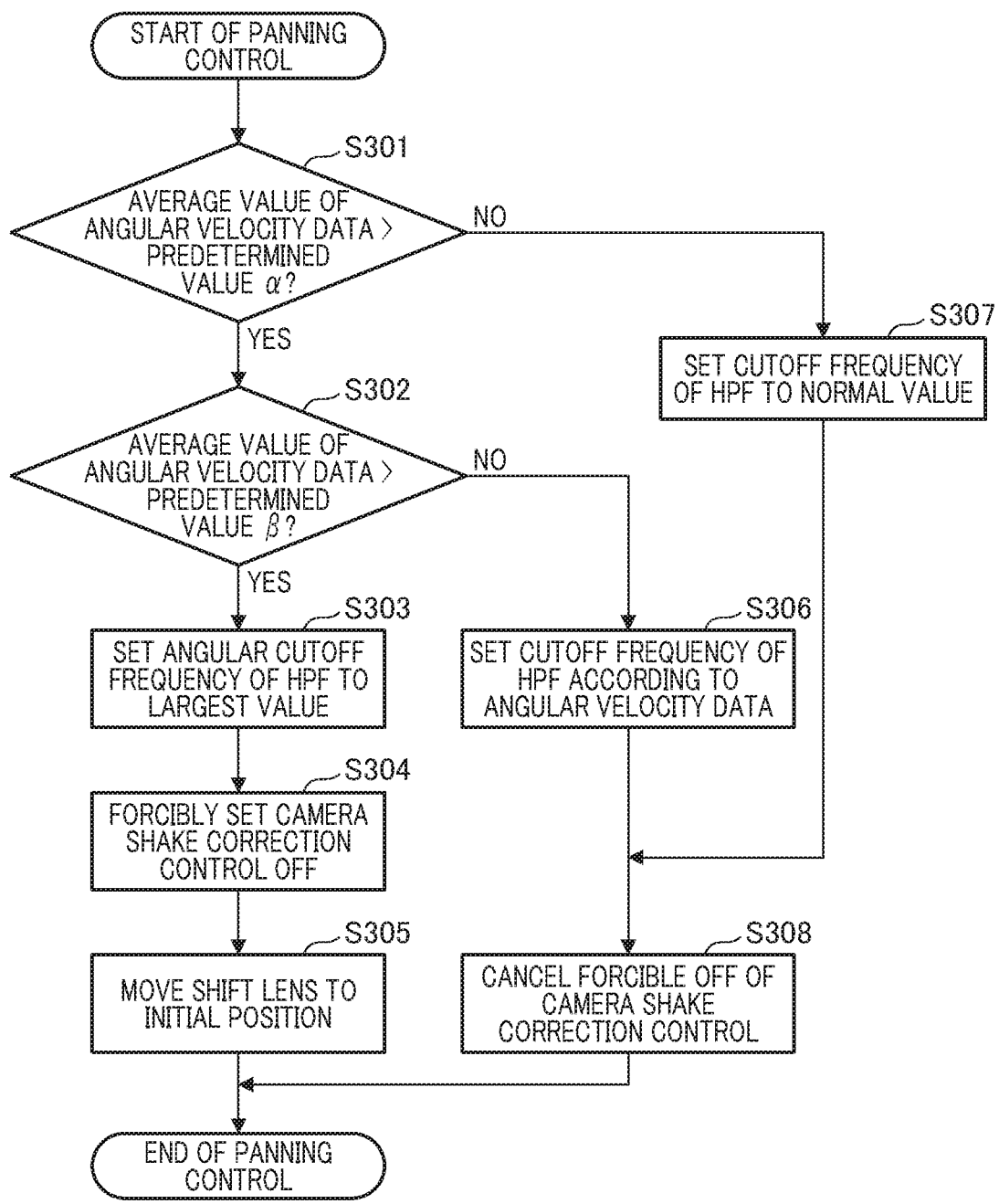
FIG. 3 is a flowchart illustrating the panning control.

In S301 of FIG. 3, the panning control unit 408 compares an average value of the angular velocity data received with the A/D converter 401 with a first threshold (hereinafter referred to as a predetermined value $\alpha$). The average value of the angular velocity data is an average value equivalent to the number of predetermined samplings and is used for a process of determining whether it is greater than the predetermined value $\alpha$. When the average value of the angular velocity data is equal to or less than predetermined value $\alpha$, it is determined that the panning is not performed and the process proceeds to S307. Conversely, when it is determined that the average value of the angular velocity data is greater than the predetermined value $\alpha$, the process proceeds to S302.

In S302, the panning control unit 408 compares the average value of the angular velocity data with a second threshold (hereinafter referred to as a predetermined value $\beta$). The magnitude of the predetermined value $\beta$ is assumed to be greater than that of the predetermined value $\alpha$. The average value of the angular velocity data is used for a process of determining whether it is greater than the predetermined value $\beta$. When the average value of the angular velocity data is equal to or less than the predetermined value $\beta$, the panning control unit 408 determines that the panning is performed slowly and the process proceeds to S306. Conversely, when the average value of the angular velocity data is greater than the predetermined value $\beta$, the panning control unit 408 determines that the panning is performed fast and the process proceeds to S303.

The panning control unit 408 sets the cutoff frequency of the HPF in the filter calculation unit 402 to the largest value in S303 and forcibly turns the camera shake correction control off in S304. This setting is performed to remove discomfort when the camera shake correction is turned off by gradually stopping the shift lens by setting the cutoff frequency of the HPF to be high. Since a movement amount considerably increases in the panning with respect to the magnitude of the camera shake at the time of fast panning, there is no discomfort even when camera shake remains at the time of turning the camera shake correction off. When the camera is considerably shaken for correction with respect to the shake at the time of the panning operation by the user without performing the setting, an image is temporarily stopped at the time of starting of the panning. However, the image considerably starts to be moved suddenly at a time point at which the shift lens subsequently arrives at a correction end. For this reason, the movement may be seen as a very unnatural motion to the user. Through the above setting, it is possible to suppress occurrence of such a phenomenon.

In S305, control is performed such that the output from the first integrator 403 is gradually changed from the current data to the data at the initial position. Thus, the shift lens group 104 is moved toward to the initial position and is finally stopped at the initial position. This is because the position of the shift lens is preferably located at the initial position of a driving range when a subsequent camera shake correction operation resumes.

When it is determined in S302 that the average value of the angular velocity data is equal to or less than the predetermined value β, that is, it is determined that the panning is performed slowly, the process proceeds to S306. In S306, the panning control unit 408 sets the cutoff frequency of the HPF according to the magnitude of the angular velocity data. The reason is that an influence of the camera shake may not be completely ignored when the panning operation is performed slowly. The process of S306 is a process that is necessary in order to perform the image shake correction while a tracking property of the image at the time of the panning operation is maintained without becoming unnatural. After the process of S306, the process proceeds to S308.

When it is determined in S301 that the average value of the angular velocity data is equal to or less than the predetermined value α, that is, it is determined that the panning is not performed, the process proceeds to S307. In S307, the panning control unit 408 sets the cutoff frequency of the HPF to a normal value (a default value). In S308, the panning control unit 408 cancels the forcible OFF setting of the camera shake correction control.

Figure 4:
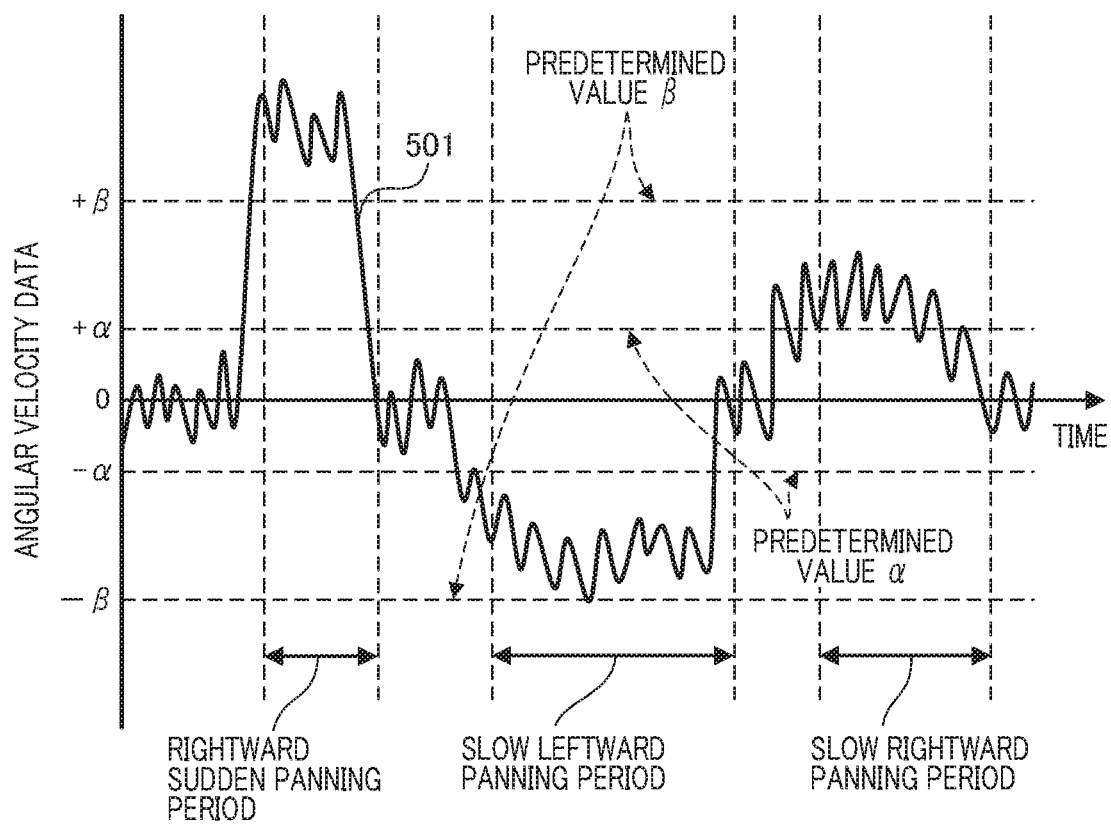
FIG. 4 is an explanatory diagram illustrating a panning determination process.

The panning operation will be described specifically with reference to FIG. 4. FIG. 4 is diagram exemplifying relations of the angular velocity data with the predetermined value α and the predetermined value β in the horizontal direction at the time of the panning operation. The horizontal axis is a time axis and the vertical axis represents the angular velocity data. A graph line 501 indicates a temporal change in the angular velocity data (sampling data). In this example, an output in the + direction is set in the case of rightward panning and an output in the − direction is set in the case of leftward panning. An initial value of the angular velocity data is set to zero. FIG. 4 illustrates an example in which sudden panning in the rightward direction and panning performed slowly in the horizontal direction is detected. During a period of sudden rightward panning, the magnitude of the angular velocity data exceeds the predetermined value β. During slow leftward or rightward panning, the magnitude of the angular velocity data is greater than the predetermined value α and less than the predetermined value β.

During a panning operation, the angular velocity data deviates considerably from an initial value. For this reason, when the angular velocity data is integrated and the driving target value of the shift lens is calculated, an output from the integrator becomes a very large value due to a direct-current (DC) offset component, and thus there is a possibility of an uncontrollable state. Accordingly, when the panning operation is detected, it is necessary to cut the DC offset component by changing the cutoff frequency of the HPF to be high. Since an output from the integrator increases in the case of sudden panning, the cutoff frequency is set to be higher. In particular, when a panning speed is high, a motion of an image at the panning speed considerably increases with respect to camera shake. For this reason, even when the camera shake correction function is turned off in a panning direction, no particular discomfort occurs. By performing the panning control in the foregoing way, it is possible to acquire an image with no discomfort even during the panning operation.

Next, a configuration of the panning control unit 118 will be described with reference to FIG. 2. In the lens control unit 113, a communication control unit 610 is installed to perform duplex communication with the camera control unit 132.

A camera information acquisition unit 601 acquires camera information from the camera control unit 132 via the communication control unit 610. The camera information includes release information and setting information of the panning assist mode. An angular velocity data output unit 602 samples the lens angular velocity data at a predetermined timing and transmits the lens angular velocity data acquired from the A/D converter 401 to the camera control unit 132.

An object angular velocity acquisition unit 603 acquires the object angular velocity data of the main object necessary for the panning assist from the camera control unit 132 via the communication control unit 610. The adder 604 sets the lens angular velocity data from the A/D converter 401 to a positive input, subtracts the object angular velocity data from the object angular velocity acquisition unit 603 as a negative input, and calculates a difference between the lens angular velocity data and the object angular velocity data. The second integrator 605 performs an integration operation on an output from the adder 604 only during a predetermined period and outputs the angle data after the integration to the switch unit 407. The predetermined period is an exposure period included in the camera information acquired by the camera information acquisition unit 601. A setting change unit 606 outputs a signal for changing the setting according to mode information acquired by the camera information acquisition unit 601 to the panning control unit 408.

When the panning assist mode is set through a switching operation on the camera body 120, the camera information acquisition unit 601 acquires the mode information from the communication control unit 610 and notifies the setting change unit 606 of the mode information. The setting change unit 606 changes setting of the panning control unit 408 according to the mode information that is notified of. The change in the setting performed here is a change for facilitating transition to a sudden panning state. Specifically, the above-described predetermined values a and 3 are changed.

The object angular velocity data of the main object transmitted from the camera body 120 to the lens control unit 113 is acquired by the object angular velocity acquisition unit 603. The adder 604 calculates a difference between the angular velocity data detected by the lens angular velocity sensor 111 and the object angular velocity data of the main object and outputs the difference to the second integrator 605. The second integrator 605 starts an integration operation according to a signal indicating the exposure period acquired by the camera information acquisition unit 601, performs integration calculation during the exposure period, and outputs an integration calculation result during the exposure period. During other periods, the second integrator 605 outputs a value for setting the position of the shift lens to a middle position. During periods other than the exposure period, control is performed such that the shift lens is moved to the middle position of a movable range. However, in this case, when the exposure period ends, the shift lens is suddenly moved from a current shift lens position to the middle position. However, a period immediately after the end of the exposure period is a period in which an image vanishes from a screen of the display unit 172 due to reading of a signal from the image sensor 122. A motion of the image due to the sudden movement of the shift lens is not problematic.

The switch unit 407 selects an output of the second integrator 605 and outputs the selected output to the adder 404 when the panning assist mode is set. The adder 404 subtracts position data of the shift lens from the output from the switch unit 407 and calculates a driving amount of the shift lens.

When a photographer performs panning at the time of the panning assist mode, the panning control unit 408 immediately performs panning control in a sudden panning state and a camera shake correction operation is disabled in the interchangeable lens 100. That is, the shift lens group 104 corrects an amount corresponding to a difference between the angular velocity of the main object and the camera angular velocity at the time of the panning operation of the camera. Thus, it is possible to raise a success probability of the panning. As a cause for a failure of the panning, a considerable difference between a movement speed of the object and a panning speed of the camera during an exposure period can be exemplified. In the embodiment, the difference is reduced by the movement of the shift lens. As a result, panning can be performed successfully.

In the normal mode in which the panning assist mode is not set, the switch unit 407 selects an output from the first integrator 403. In this case, the lens angular velocity sensor 111 detects shake of the camera due to camera shake or the like and the adder 404 calculates a driving amount of the shift lens based on the output from the first integrator 403. An image shake correction operation corresponding to camera shake or the like is performed by movement of the shift lens.

Figure 5:
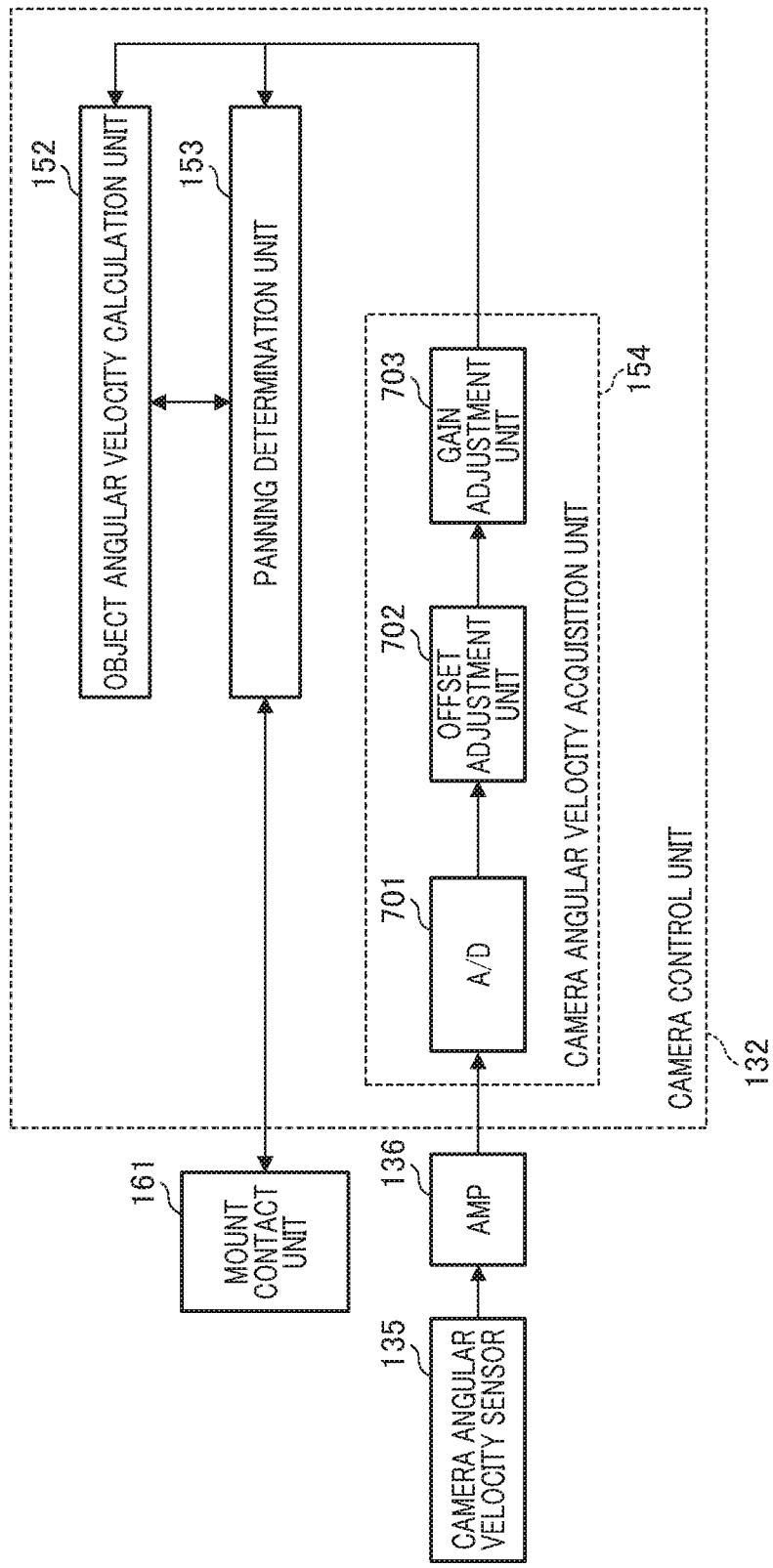
FIG. 5 is a block diagram illustrating a configuration of main units of a camera control unit.

FIG. 5 is a diagram illustrating a configuration related to the camera angular velocity sensor 135. The used reference numerals are given to the same constituent elements as those in FIG. 1. First, the configuration of the camera angular velocity acquisition unit 154 will be described with reference to FIG. 5.

An A/D converter 701 acquires a shake detection signal detected by the camera angular velocity sensor 135 from the amplifier 136 and converts the shake detection signal into a digital signal. An offset adjustment unit 702 corrects an offset component included in an output from the camera angular velocity sensor 135 by using an adjustment value. A gain adjustment unit 703 corrects a variation due to sensitivity of the camera angular velocity sensor 135. Each adjustment value is recorded in a process of manufacturing the camera body 120 in the ROM 182. An adjustment value of the offset component is calculated from an output from the camera angular velocity sensor 135 in a state in which the camera body 120 is installed in a location in which there is no vibration and is recorded in the ROM 182. An adjustment value of the variation in the sensitivity is calculated as a value adjusted so that a gain of the output from the camera angular velocity sensor 135 falls in a standard value and is recorded in the ROM 182 in a state in which the camera body 120 is installed on a shake addition stand that provides predetermined shake.

The output of the camera angular velocity sensor 135 corrected through the offset adjustment and the gain adjustment is transmitted to the object angular velocity calculation unit 152 or the panning determination unit 153. The object angular velocity calculation unit 152 acquires the output from the camera angular velocity sensor 135, acquires the output from the lens angular velocity sensor 111 from the panning determination unit 153, and calculates the object angular velocity data. In the camera angular velocity sensor 135, output characteristics change due to a temperature change or changes over time in some cases. Accordingly, each adjustment value recorded in the ROM 182 may not be one value, but may be retained as table data so that the adjustment value is switched according to a condition such as temperature.

Figure 6:
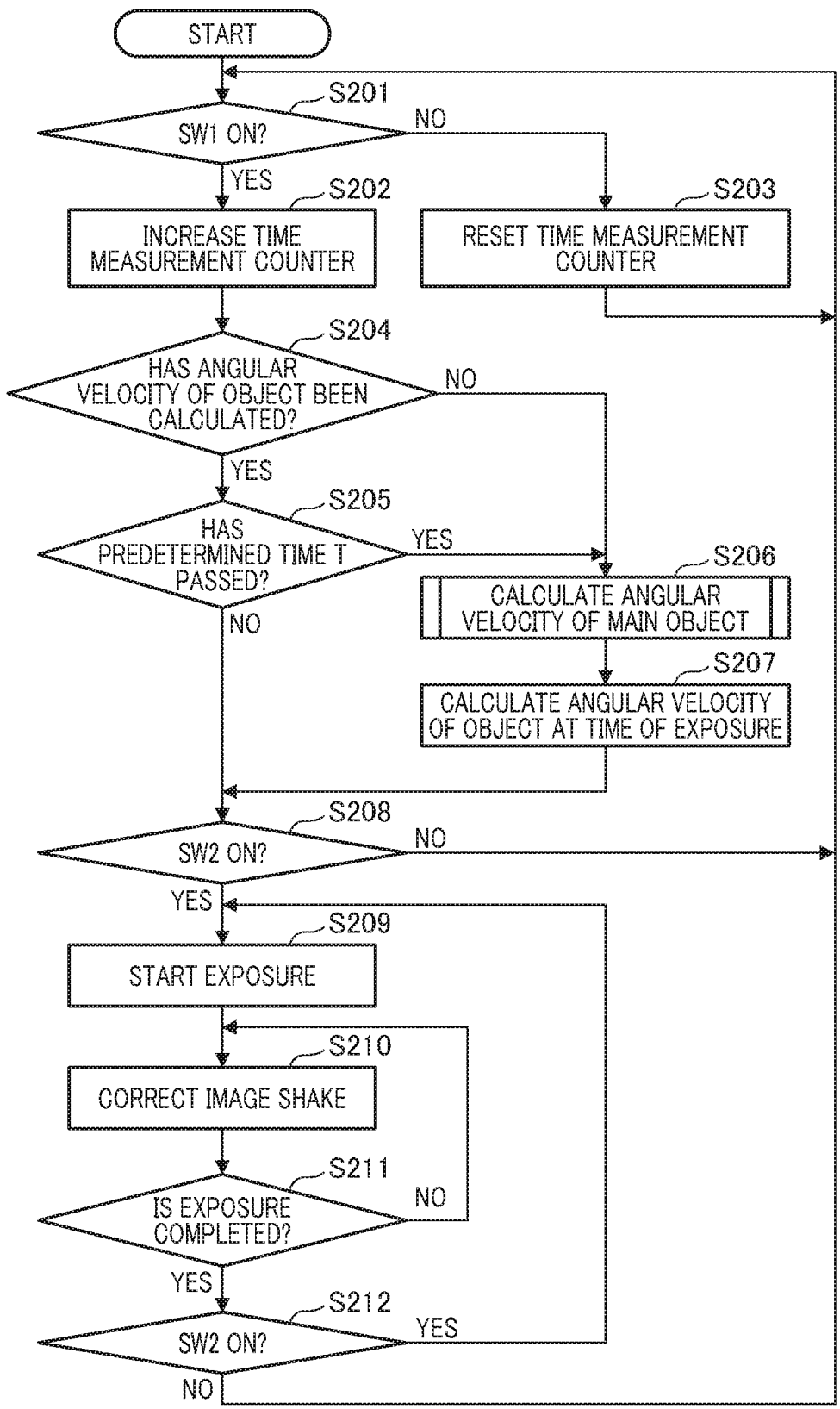
FIG. 6 is a flowchart for describing a process in a panning assist mode.

FIG. 6 is a flowchart for describing a photographing process in the panning assist mode. The following process is performed under the control of the camera control unit 132. S201 is a process of determining whether the first switch SW1 is turned on through a half-push operation on the release button. When the camera control unit 132 detects the half-push operation, the process proceeds to S202. When the half-push operation is not detected, the process proceeds to S203. In S202, a time measurement counter increases and the process proceeds to S204. After the time measurement counter is reset in S203, the process returns to S201.

In S204, the camera control unit 132 determines whether the angular velocity of the main object has been calculated. When the angular velocity of the main object is calculated, the process proceeds to S205. When the angular velocity of the main object is not calculated, the process proceeds to S206.

In S205, the camera control unit 132 determines whether a value of the time measurement counter reaches a predetermined time (denoted by T). The predetermined time T is a threshold time for determination. When a measured value of the time measurement counter is greater than the predetermined time T, that is, the predetermined time T has elapsed, the process proceeds to S206. Conversely, when the predetermined time T has not elapsed, the process proceeds to S208.

In S206, the camera control unit 132 calculates an angular velocity of the main object. Here, the reason for recalculating the angular velocity of the main object is that it is necessary to deal with a case in which an angular velocity of the main object changes over time. The object angular velocity of the main object calculated in S206 is transmitted to the lens control unit 113 for each calculation. A process of calculating the angular velocity of the main object will be described later with reference to FIG. 7.

In S207, the camera control unit 132 calculates the angular velocity using the angular velocity of the object equivalent to the number of previous frames acquired by the object angular velocity calculation unit 152. The user adds a time lag between a time point of a half-push operation on the release button and an exposure start time point and performs a process of calculating the angular velocity of the object at the time of exposure to determine an angular velocity of the object. In S208, the camera control unit 132 determines whether the second switch SW2 is turned on through the full-push operation on the release button. When it is determined in S208 that the full-push operation on the release button is not performed, the process returns to S201. Conversely, when it is determined in S208 that the full-push operation on the release button is performed, the process proceeds to S209.

In S209, the camera control unit 132 performs shutter control through the shutter control unit 151 to start exposure. In S210, the panning control unit 118 and the camera shake correction control unit 117 cooperate to move the shift lens group 104 and perform image shake correction on the object. In S211, the camera control unit 132 performs a process of determining exposure completion. When it is determined that the exposure is completed, the process proceeds to S212. When it is determined that the exposure is not completed, the process returns to S210. In S212, the camera control unit 132 determines whether the second switch SW2 is turned on through a full-push operation on the release button. When it is determined in S212 that the full-push operation on the release button is performed, the process returns to S209 and subsequent photography starts. When it is determined in S212 that the full-push operation on the release button is not performed, the process returns to S201.

Next, a process of calculating an angular velocity of the main object in S206 of FIG. 6 will be described with reference to the flowchart of FIG. 7. In the embodiment of the present invention, the background and the main object are determined by comparing a motion vector amount with an output value of the angular velocity sensor in the panning assist function. In this case, when an offset component is added to the output from the angular velocity sensor, there is a possibility of the main object and the background being unable to be correctly determined. Accordingly, by calculating the panning angular velocity using the angular velocity information suitable for the process of extracting the object and the process of calculating the angular velocity of the object, it is possible to improve precision of the panning assist function. The object angular velocity calculation unit 152 (hereinafter simply referred to as a calculation unit) performs the following process and determines the angular velocity of the object based on the motion vector of the object acquired from the motion vector detection unit 141. This process starts when the calculation unit 152 acquires the motion vector from the motion vector detection unit 141.

In S601, the calculation unit 152 determines whether acquisition of the angular velocity detection signal from each of the lens angular velocity sensor 111 and the camera angular velocity sensor 135 is completed. When it is determined that the acquisition of the angular velocity detection signal is not completed, the process ends. Conversely, when it is determined that the acquisition of the angular velocity detection signal is completed, the process proceeds to S602.

Figure 8:
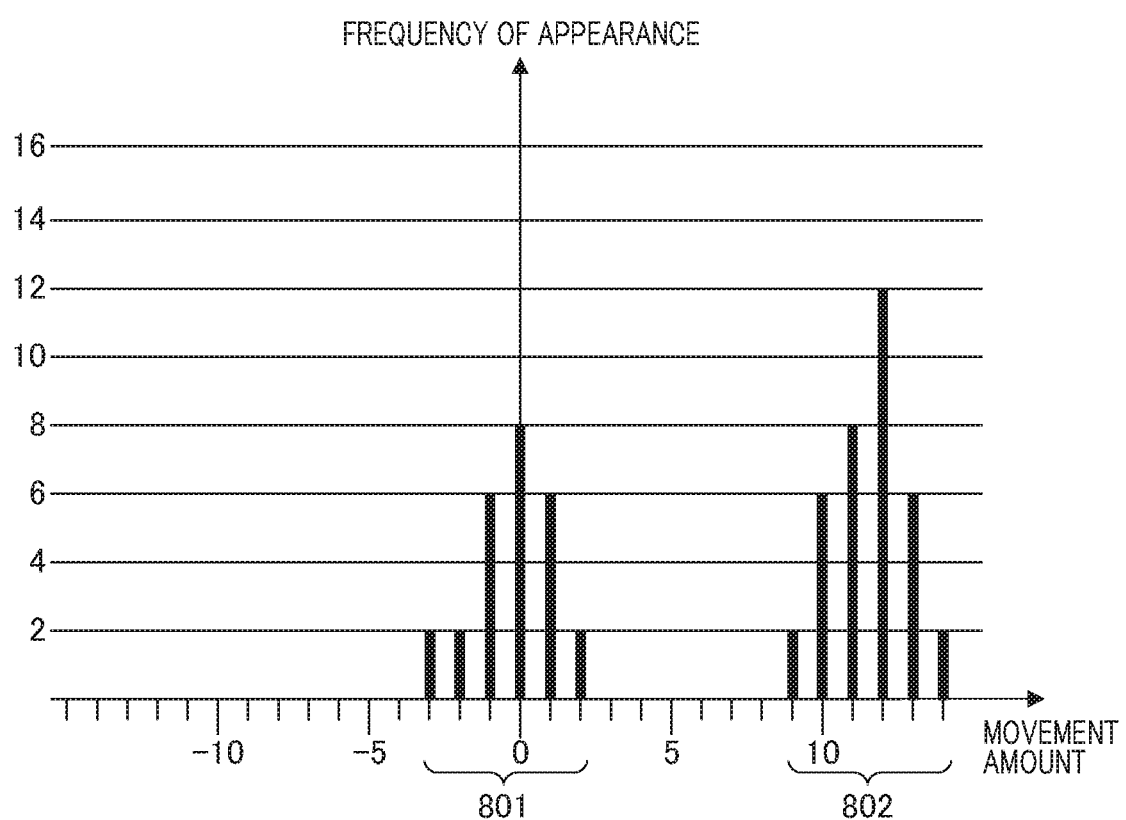
FIG. 8 is a diagram illustrating a frequency distribution of a movement amount.

In S602, the calculation unit 152 generates a histogram related to a movement amount from the acquired motion vector. An example of the histogram will be described with reference to FIG. 8. The horizontal axis of the histogram represents a movement amount and the vertical axis represents a frequency of appearance. Here, the movement amount to be output includes a movement amount corresponding to the main object which the photographer attempts to photograph and a movement amount corresponding to a flowing background.

In S603, the calculation unit 152 performs a process of extracting the main object based on the angular velocity detection information acquired from the camera angular velocity sensor 135 and the histogram generated in S602. Here, since the camera body 120 is adjusted during manufacturing so that an angular velocity sensor output suitable for each entity can always be obtained, an output from the camera angular velocity sensor 135 in which an influence of the offset is less than the lens angular velocity sensor 111 is used. Subsequently, the calculation unit 152 calculates a movement amount on an image surface from the acquired angular velocity. The calculation method will be described with reference to FIG. 9.

Figure 9:
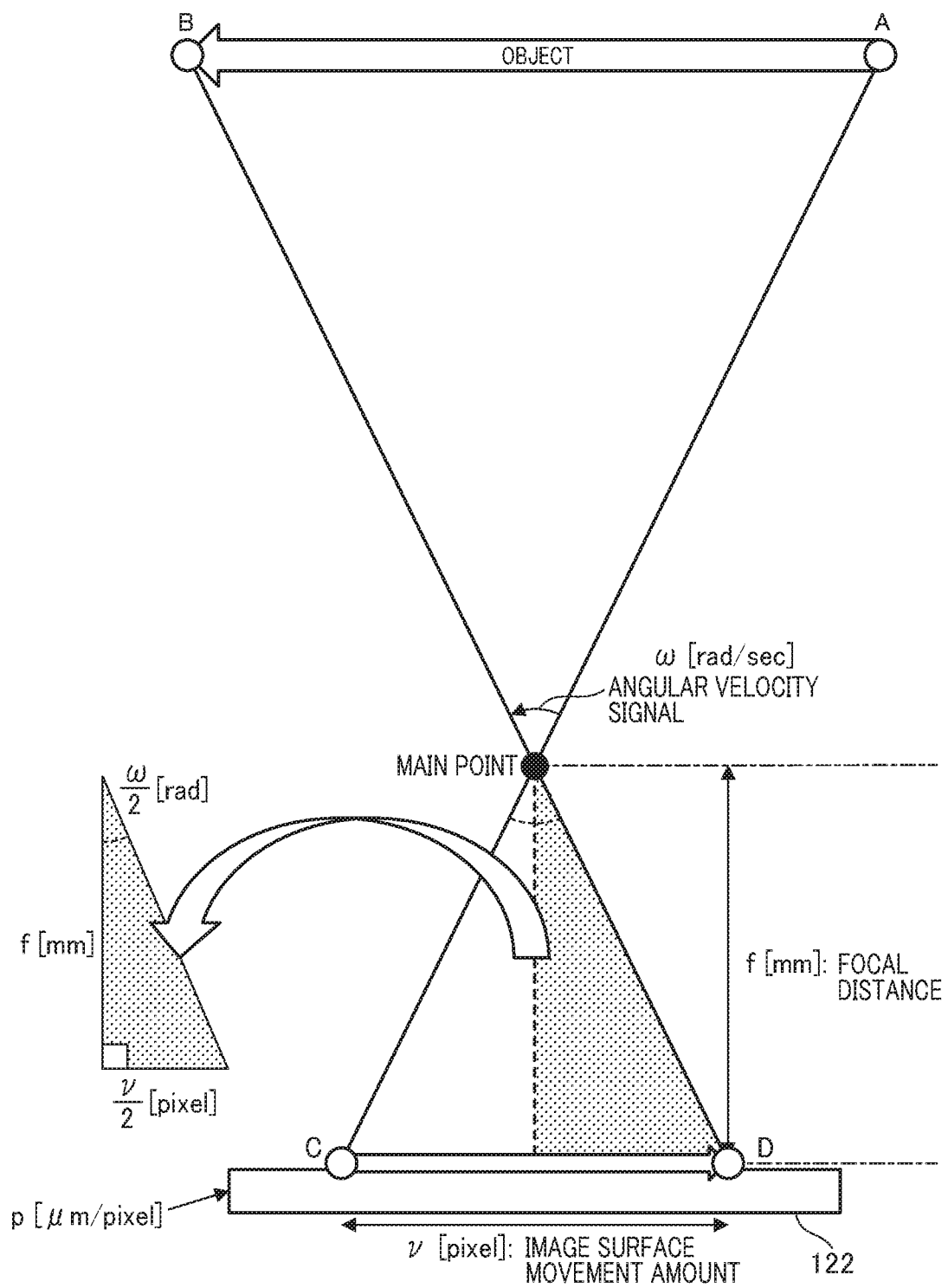
FIG. 9 is an explanatory diagram illustrating a process of calculating a movement amount on an image surface from an angular velocity.

FIG. 9 is a schematic diagram illustrating movement of an object image formed on the image sensor from a point C to a point D with movement of an object from a point A to a point B during a period of t seconds. Various amounts to be used are defined as follows. Units are shown in [ ].

v [pixel]: a distance between points C and D f [mm]: a focal distance of the imaging optical system p [μm/pixel]: a pixel pitch of the image sensor $\omega$ [rad/sec]: an angular velocity of the object on the image surface $\omega_p$ [rad/sec]: panning angular velocity of the camera $v_p$ [pixel]: a movement amount on the image surface The angular velocity $\omega$ of the object on the image surface is expressed in Expression 1 below. In addition, tan is a tangent function.

$$\tan\frac{\omega}{2}[\text{rad/sec}] = \frac{v}{2}[\text{pixel}] \times \frac{p}{1000}[\text{mm/pixel}] \div t[\text{sec}] \div f[\text{mm}] = \frac{vp}{2000tf} \quad \text{(Expression 1)}$$

The movement mount $v_p$ on the image surface by panning can be calculated from the panning angular velocity $\omega_p$ of the camera in accordance with Expression 2 below.

$$v_p = \frac{2000tf \times \tan\left(\frac{\omega_p}{2}\right)}{p} \text{ [pixel]} \quad \text{(Expression 2)}$$

When the movement amount of the background is converted into the angular velocity on the image surface using Expression 2, the converted angular velocity is consistent with the panning angular velocity $\omega_p$. The movement amount corresponding to the object in the histogram and the movement amount corresponding to the background can be separated from the relation. Specifically, two peaks (peaks of the frequency of appearance) in the frequency distribution of FIG. 8 indicate a first data group 801 and a second data group 802, respectively. A data group consistent with the angular velocity of the camera body 120 is the second data group 802 and the calculation unit 152 determines the data group 802 as the data group of the movement amount corresponding to the background. The first data group 801 is determined as the data group of the movement amount corresponding to the main object.

Figure 7:
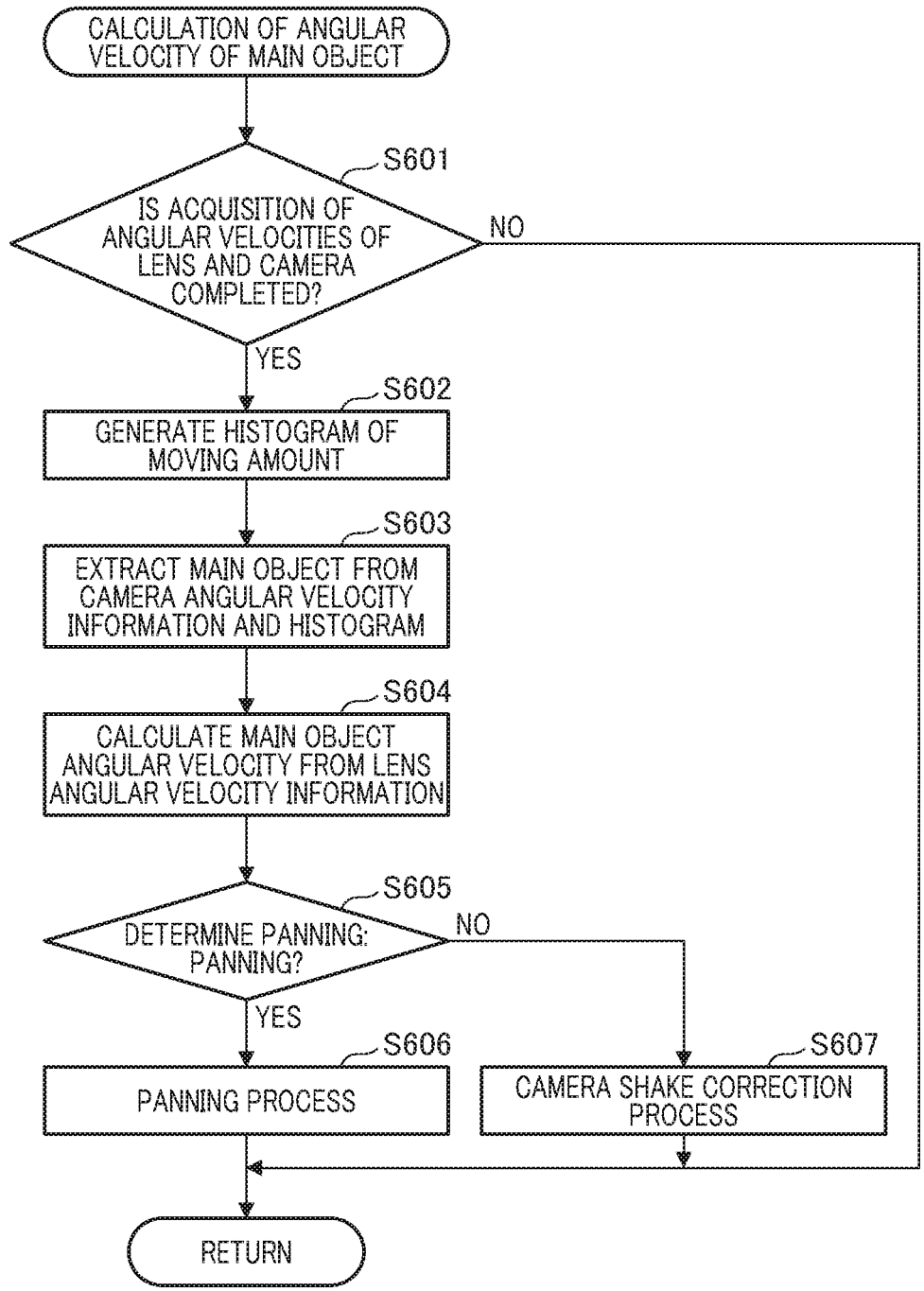
FIG. 7 is a flowchart for describing calculation of a main object angular velocity in a first example.

In S604 of FIG. 7, the calculation unit 152 calculates the angular velocity of the main object based on the angular velocity detection information of the lens angular velocity sensor 111. The angular velocity of the main object is calculated using the panning angular velocity by the lens angular velocity sensor 111. The reason is that a correction amount of the shift lens is determined based on the angular velocity detection information of the lens angular velocity sensor 111, as described above. By calculating the angular velocity of the main object with respect to the detection output from the lens angular velocity sensor 111, it is possible to improve precision of the image shake correction.

The angular velocity of the main object is calculated as an angular velocity centering on a main point, as illustrated in FIG. 9. The angular velocity $\omega$ [rad/sec] of the object on the image surface is expressed in Expression 3 below. Here, tan-1( ) is an arc tangent function.

$$\omega = 2\tan^{-1}\left(\frac{vp}{2000tf}\right) \text{ [rad/sec]} \quad \text{(Expression 3)}$$

When the panning of the camera body 120 is performed, the angular velocity ω of the object on the image surface is calculated in accordance with Expression 4 below. In Expression 4, when $\omega_s$ is an angular velocity of the main object (hereinafter referred to as a main object angular velocity), the angular velocity ω of the object on the image surface is calculated by subtracting the panning angular velocity $\omega_p$ from the main object angular velocity $\omega_s$.

$$\omega = \omega_s - \omega_p \quad \text{(Expression 4)}$$

Accordingly, the main object angular velocity $\omega_s$ is obtained by adding the panning angular velocity $\omega_p$ detected by the lens angular velocity sensor 111 to the angular velocity ω of the object on the image surface in accordance with Expression 5 below.

$$\omega_s = \omega + \omega_p \quad \text{(Expression 5)}$$

The method of calculating the main object angular velocity is not limited to the foregoing method. For example, a value designated in advance with the operation unit 131 can also be used.

Figure 10A:
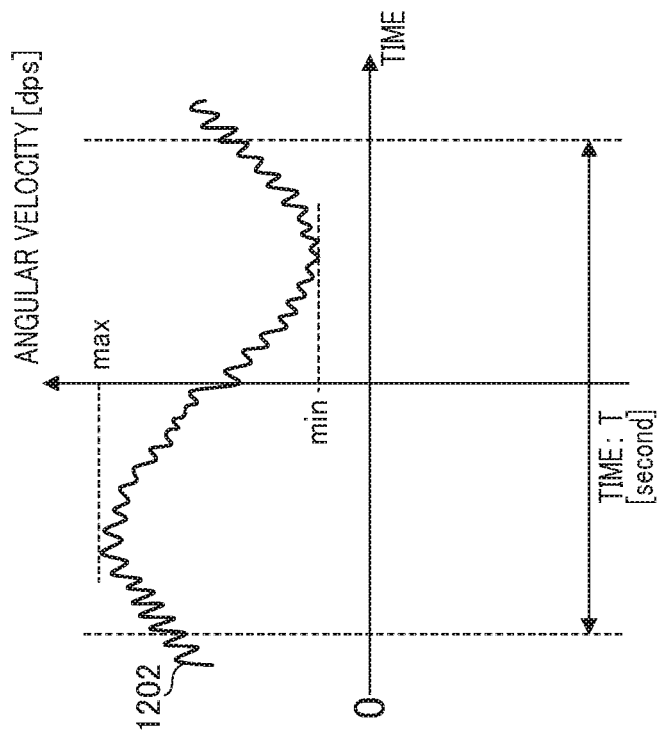
FIGS. 10A and 10B are diagrams illustrating a sample example of angular velocity data.

In S605 of FIG. 7, the camera control unit 132 determines whether the panning operation of the camera is performed. A specific example will be described with reference to FIG. 10A. FIG. 10A illustrates a sample example of angular velocity data 1201 for a certain time (notated as T [seconds]). The horizontal axis represents a time axis and the vertical axis represents an angular velocity (unit: degree per second). In this example, an output in the + direction at the time of upward movement is defined and an output in the − direction at the time of downward movement is defined. The time T is, for example, a time equivalent to 20 frames. The calculation unit 152 compares a difference between a maximum value max and a minimum value min of the angular velocity data 1201 in the time T with a predetermined threshold. The predetermined threshold is, for example, tens of dps. When the difference is equal to or greater than the threshold, it is determined that an amplitude motion such as camera shake occurs and the process proceeds to S607 of FIG. 7. Conversely, when the difference is less than the threshold, the process proceeds to S606 of FIG. 7.

In S606, a process for the panning assist is performed. In this case, camera shake of the main object is corrected. In S607, an image shake correction process on the camera shake or the like is performed. In this case, the control of the panning assist is not performed. The process proceeds to a return process after the processes of S606 and S607.

In the example, both the angular velocity detection signal of the camera angular velocity sensor 135 and the angular velocity detection signal of the lens angular velocity sensor 111 are used. The process of extracting the main object is performed using the angular velocity information by the camera angular velocity sensor 135 of the camera body 120 in which the influence of the offset is less. Then, the process of calculating the main object angular velocity is performed using the angular velocity information by the lens angular velocity sensor 111 and the object shake is corrected through the panning assist during exposure. According to the example, it is possible to provide the imaging apparatus capable of acquiring a good image in which the influence of the offset of the angular velocity sensor is reduced.

Second Example

Next, a second example of the present invention will be described. In the example, the used reference numerals are given to the same constituent elements as those of the first example. The description thereof will be omitted and differences will be mainly described. The description omission method is also the same in examples to be described below.

Figure 11:
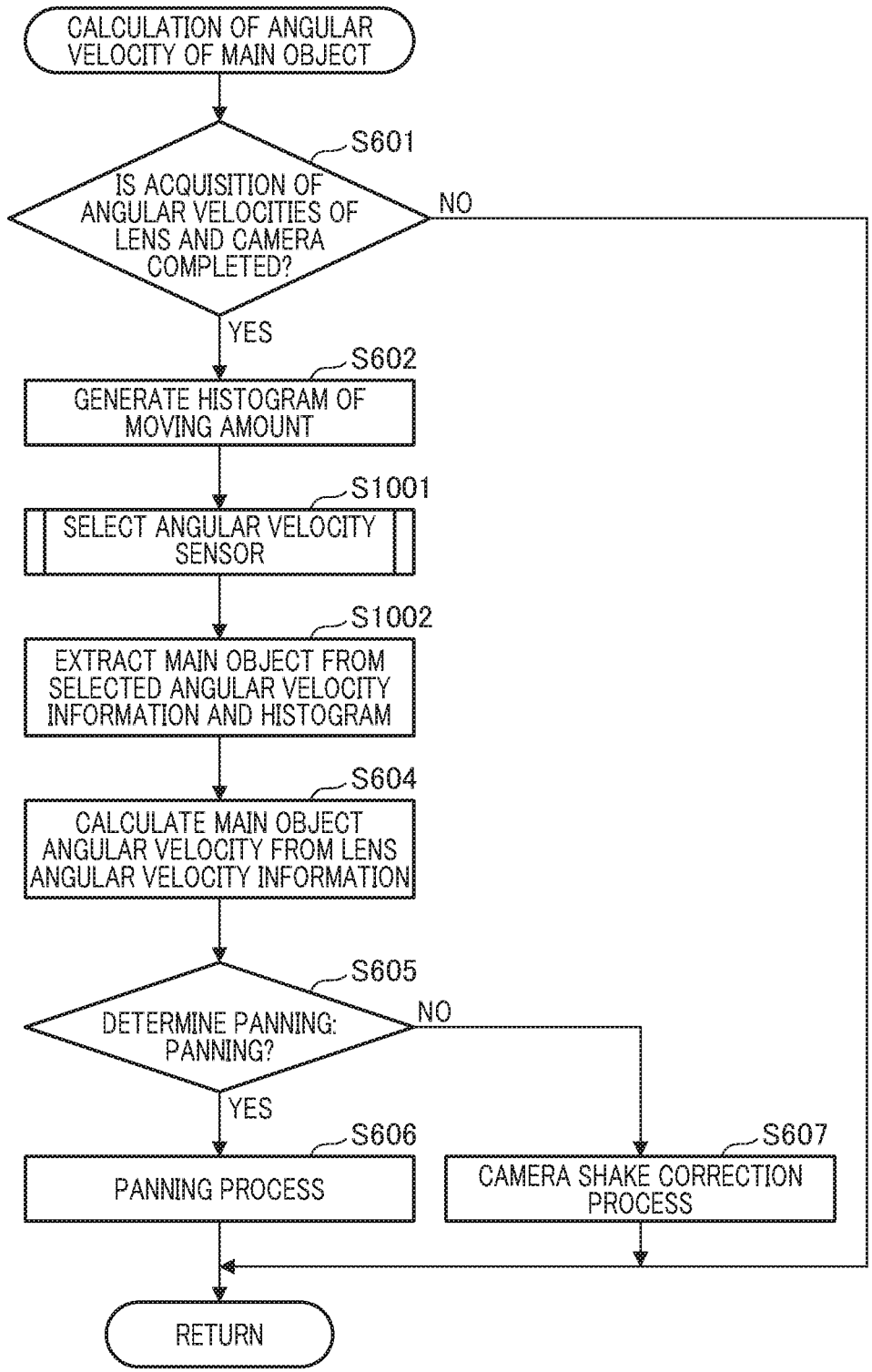
FIG. 11 is a flowchart for describing calculation of an angular velocity of a main object in a second example.

FIG. 11 is a flowchart illustrating a process of calculating a main object angular velocity performed by the calculation unit 152 according to the example. The same reference numerals are used in processes common to FIG. 7. The process starts when the calculation unit 152 acquires the motion vector from the motion vector detection unit 141. In S601, when the calculation unit 152 acquires the angular velocity detection signal from the angular velocity sensor in the camera body 120 and the angular velocity sensor in the interchangeable lens 100, the process proceeds to S602. In S602, the process of generating the histogram related to the motion amount from the acquired motion vector is performed.

In S1001, a process of selecting an output of the angular velocity sensor in which the offset is less between the camera angular velocity sensor 135 and the lens angular velocity sensor 111 is performed. The details of the selection process will be described later with reference to FIG. 12.

In S1002, the calculation unit 152 performs the process of extracting the main object as in S603 of FIG. 7 based on the output of the angular velocity sensor selected in S1001. From S604 to S607, the main object angular velocity is calculated using the panning angular velocity acquired by the lens angular velocity sensor 111. When it is determined that the panning operation of the camera body 120 is performed, the image shake of the object is corrected.

Next, the process of selecting the output of the angular velocity sensor will be described with reference to the flowchart of FIG. 12. In S1101, angular velocity information output by each of the plurality of angular velocity sensors is acquired. In S1102, the calculation unit 152 determines whether the camera body 120 is in a stop state. From the histogram generated in S602 of FIG. 11, it is determined whether the frequency of appearance is equal to or greater than a predetermined value based on the frequency of appearance in which the movement amount is near zero in the frequency distribution. A specific example will be described with reference to FIG. 13.

Figure 13:
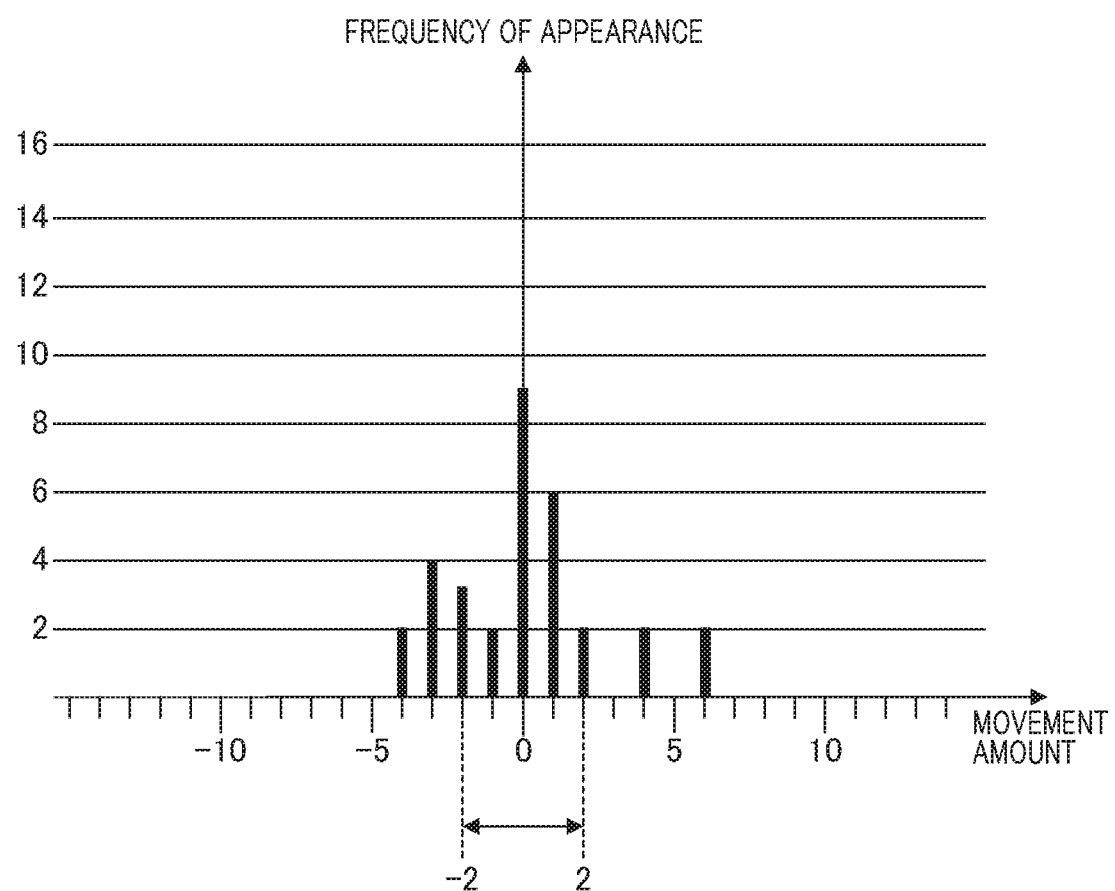
FIG. 13 is a diagram illustrating a frequency distribution of a movement amount at the time of stop.

FIG. 13 illustrates an example of a histogram centering on a position at which the movement amount is near zero. The horizontal axis represents a movement amount and the vertical axis represents a frequency of appearance. When the histogram in FIG. 13 is generated in S602 of FIG. 11, data within a range of the movement amount from −2 to 2 is extracted and there is data of which the frequency of appearance exceeds 8. In this case, since the frequency of appearance near the movement amount of zero is equal to or greater than a predetermined threshold, the calculation unit 152 determines that the camera body 120 is in the stop state.

Figure 12:
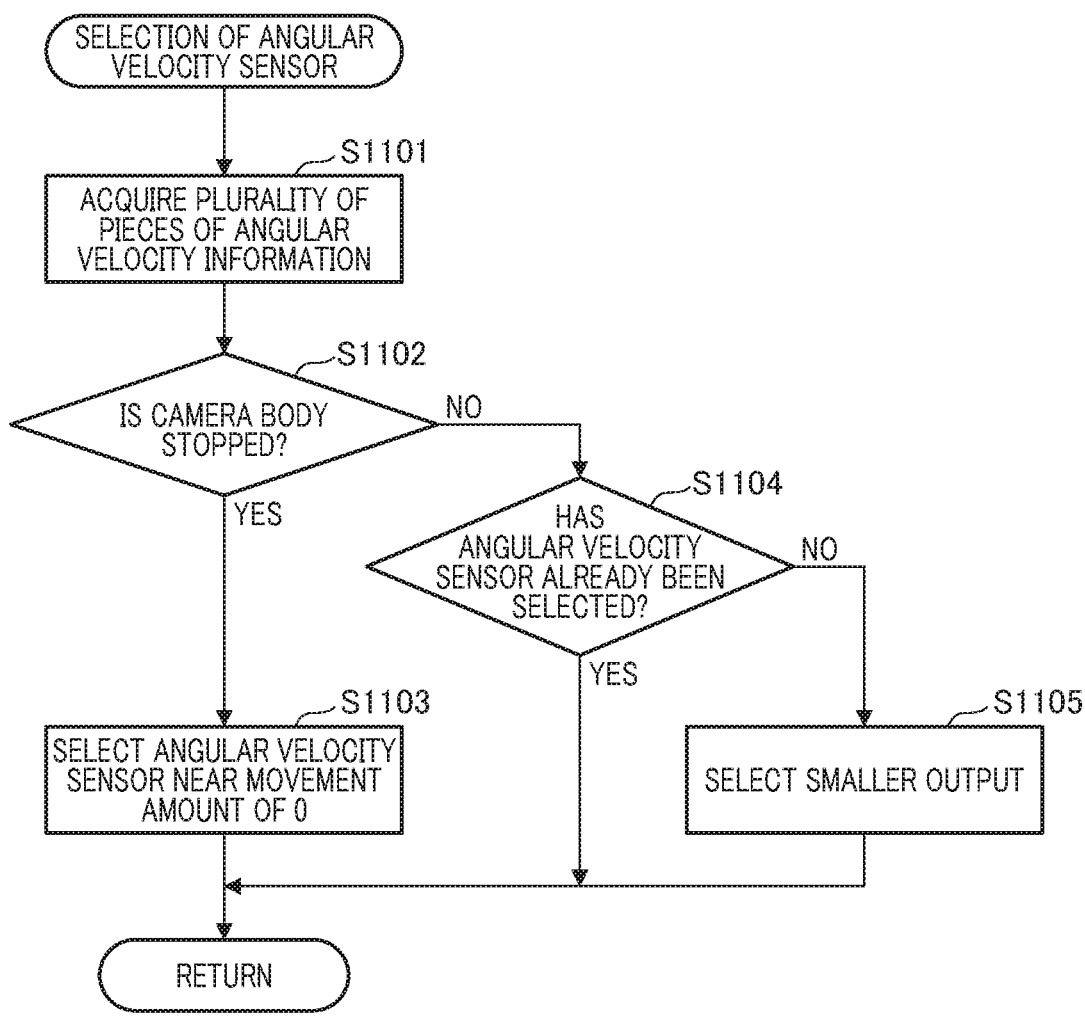
FIG. 12 is a flowchart for describing a process of selecting an angular velocity sensor.

When it is determined in S1102 of FIG. 12 that the camera body is in the stop state, the process proceeds to S1103. When it is determined that the camera body is not in the stop state, the process proceeds to S1104. In S1103, the calculation unit 152 calculates the movement amount on the image surface from the output from the angular velocity sensor using Expression 2 and selects the angular velocity sensor for which the calculation result is close to zero. The reason is that the output from the angular velocity sensor is a value close to zero when the camera body 120 is in the stop state. That is, when the output is a value greater than zero, it is indicated that an offset component is added to the output from the angular velocity sensor.

In S1104, the calculation unit 152 determines whether the angular velocity sensor has been selected previously. When the angular velocity sensor has been selected previously, the result of the process of selecting the angular velocity is set as the selected angular velocity, the process ends, and the process returns to a return process. Conversely, when it is determined that the angular velocity sensor has been selected previously, the process proceeds to S1105. When a time equal to or greater than a threshold time has passed from the previous selection time point, the process may proceed to S1105 as an unselected state.

In S1105, the calculation unit 152 compares output values of the plurality of angular velocity sensor acquired in S1101 and selects the smaller output value. Then, the process proceeds to the return process. In the example, the process of selecting the smaller output value is performed in S1105, but the present invention is not limited thereto. For example, when there is an adjusted angular sensor among the plurality of angular velocity sensors, a process of selecting an output of the angular velocity sensor may be performed.

According to the example, by dynamically selecting the angular velocity sensor in which the offset is smaller among the plurality of angular velocity sensors, it is possible to perform the process of extracting the main object based on the output of the typically considerably angular velocity sensor. Thus, in the imaging apparatus including the plurality of angular velocity sensors, the good image shake correction can be performed. In the example, the example in which the process of selecting the angular velocity sensor is performed in the flowchart in the panning assist mode has been described. The present invention is not limited thereto. For example, a motion vector may be acquired at a start timing of live-view display and a process of selecting the angular velocity sensor may be performed.

Third Example

Next, a third example of the present invention will be described.

Figure 14:
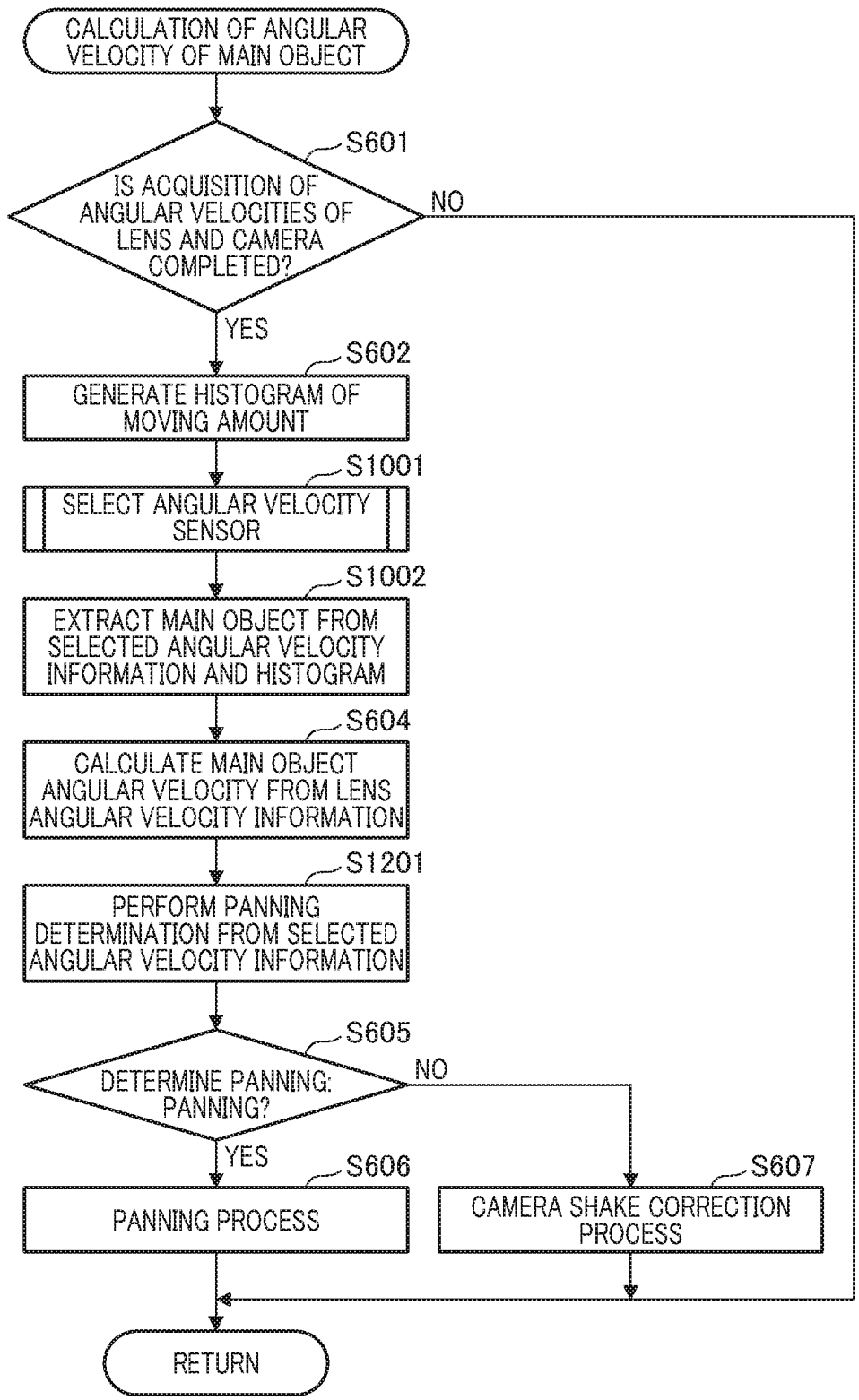
FIG. 14 is a flowchart for describing calculation of an angular velocity of a main object in a third example.

FIG. 14 is a flowchart for describing a process of calculating an object angular velocity by the calculation unit 152 according to the example. The following process starts when the calculation unit 152 acquires the motion vector from the motion vector detection unit 141. S1201 which is a difference from FIG. 11 will be described.

Figure 10B:
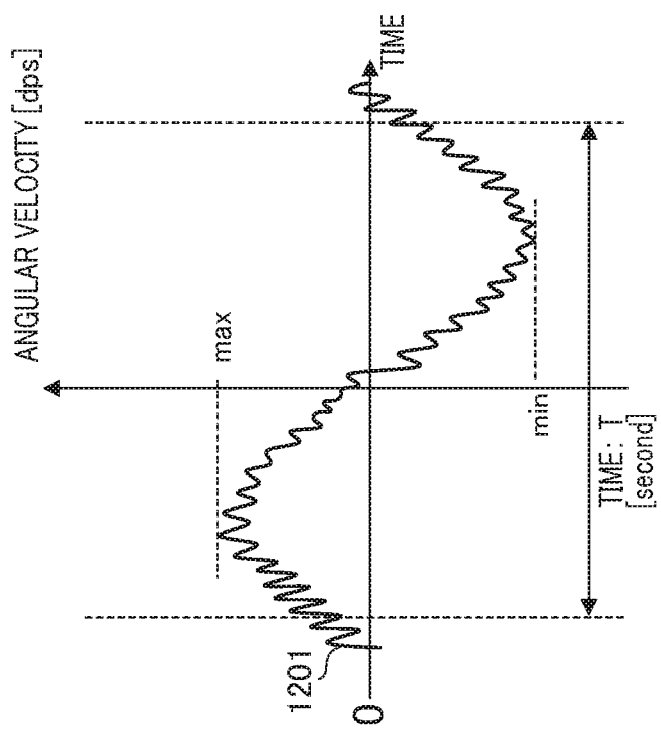

After S604, the process proceeds to S1201. The calculation unit 152 determines panning determination using the output of the angular velocity sensor selected in S1001. The reason will be described with reference to FIG. 10B. FIG. 10B illustrates an example in which an offset component is included in a sample of angular velocity data 1202 in a certain time T. When the offset component is added as in the angular velocity data 1202, a waveform deviates in the vertical direction (the direction of the angular velocity axis). Depending on an amount of the offset component to be added, it is difficult to determine whether the cause is camera shake even when a difference a maximum value max and a minimum value min of the angular velocity data 1202 is equal to or greater than a threshold. Accordingly, the calculation unit 152 determines not only a difference in an amplitude but also a condition that the maximum value max is output in a positive region of the angular velocity axis and the minimum value min is output in a negative region of the angular velocity axis by using the output of the angular velocity sensor in which the offset component is less. When the condition is satisfied and the difference between the maximum value max and the minimum value min is equal to or greater than the threshold, it is determined that the amplitude motion such as camera shake occurs. Accordingly, more accurately amplitude determination is possible.

After the process of S1201, the processes of S605 to S607 are performed and the panning process or the camera shake correction process is performed based on the panning determination result of S1201.

In the embodiment, by determining whether the camera body vibrates due to camera shake or the like based on the output of the angular velocity in which the dynamically selected offset is small, more accurately amplitude determination is possible. According to the example, in the imaging apparatus including the plurality of angular velocity sensors, the good image shake correction can be performed.

The preferred embodiments of the present invention have been described above, but the present invention is not limited to the embodiments and various modifications and changes can be made within the scope of the gist of the present invention.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-085211, filed Apr. 24, 2017, which is hereby incorporated by reference wherein in its entirety.

What is claimed is:

1. An image shake correction device in which blur of an image of an object captured by an image sensor through an imaging optical system is corrected by an image blur correction unit includes a correction lens, the image blur correction device comprising:
   a memory;
   at least one processor configured to perform a following function in accordance with a program stored in the memory;
   an acquisition unit configured to acquire angular velocity information regarding shake detected by a plurality of detectors and acquire a motion vector calculated from a plurality of images captured by the image sensor; and
   a control unit configured to perform control such that image blur of the object is suppressed by the image blur correction unit,
   wherein the control unit specifies the object using the motion vector and first or second angular velocity information among a plurality of pieces of the angular velocity information,
   wherein the first angular velocity information and the second angular velocity information are respectively detected by detectors that are respectively mounted on a camera body and an interchangeable lens that can be mounted on the camera body,
   wherein the control unit calculates an angular velocity of the object with respect to the image blur correction device using the second angular velocity information, and controls the image blur correction unit.

2. The image blur correction device according to claim 1, wherein the control unit performs first control such that the image blur correction unit is controlled using the calculated angular velocity of the object and performs second control such that the image blur correction unit is controlled using the second angular velocity information.

3. The image blur correction device according to claim 1, wherein the control unit generates a frequency distribution from the acquired motion vector and specifies the object using the generated frequency distribution and the first angular velocity information.

4. The image blur correction device according to claim 3, wherein the control unit calculates a motion vector of the object and calculates an angular velocity of the object in accordance with the motion vector and the second angular velocity information.

5. The image blur correction device according to claim 1, wherein the control unit performs a process of selecting angular velocity information in which an offset is small from the pieces of angular velocity information detected by the plurality of detectors.

6. The image blur correction device according to claim 5, wherein the control unit determines whether a panning or tilting operation is performed, using the selected angular velocity information.

7. The image blur correction device according to claim 6, wherein the control unit calculates an angular velocity of the panning or tilting from the selected angular velocity information, generates a frequency distribution from the acquired motion vector, and calculates a motion vector of the object from the generated frequency distribution and the angular velocity of the panning or tilting.

8. The image blur correction device according to claim 6, wherein the control unit performs first control such that the image blur correction unit is controlled using the calculated angular velocity of the object when the panning or tilting operation is performed, and the control unit performs second control such that the image blur correction unit is controlled using the second angular velocity information when the panning or tilting operation is not performed.

9. The image blur correction device according to claim 1, wherein the image blur correction unit changes a position at which light from the object is formed as an image by the correction lens.

10. An imaging apparatus that includes an image blur correction device in which blur of an image of an object captured by an image sensor through an imaging optical system is corrected by an image blur correction unit includes a correction lens and a body on which a lens device is mounted, the imaging apparatus comprising:
    a memory;
    at least one processor configured to perform a following function in accordance with a program stored in the memory;
    an acquisition unit configured to acquire angular velocity information regarding shake detected by a plurality of detectors and acquire a motion vector calculated from a plurality of images captured by the image sensor; and
    a control unit configured to perform control such that image blur of the object is suppressed by the image blur correction unit,
    wherein the control unit specifies the object using the motion vector and first or second angular velocity information among a plurality of pieces of the angular velocity information,
    wherein the first angular velocity information and the second angular velocity information are respectively detected by detectors that are respectively mounted on a camera body and an interchangeable lens that can be mounted on the camera body,
    wherein the control unit calculates an angular velocity of the object with respect to the image blur correction device using the second angular velocity information, and controls the image blur correction unit.

11. The imaging apparatus according to claim 10, comprising:
    a first acquisition unit configured to acquire the first angular velocity information detected by a first detector included in the body; and
    a second acquisition unit configured to acquire the second angular velocity information detected by a second detector included in the lens device,
    wherein the control unit specifies the object using the motion vector and the angular velocity information selected from the first angular velocity information and the second angular velocity information and calculates an angular velocity of the object using the second angular velocity information.

12. The imaging apparatus according to claim 11, wherein the control unit compares the first angular velocity information with the second angular velocity information acquired when the body is in a stopped state, selects the detector in which the angular velocity is slower, and specifies the object using the angular velocity information and the motion vector by the selected detector.

13. The imaging apparatus according to claim 10, further comprising:
    a setting unit configured to set a mode in which panning is supported, wherein the control unit performs the first control such that the image blur correction unit is controlled using the calculated angular velocity of the object when the mode is set, and the control unit performs second control such that the image blur correction unit is controlled using the second angular velocity information when the mode is not set.

14. A control method performed in an image blur correction device in which blur of an image of an object imaged by an image sensor through an imaging optical system is corrected by an image blur correction unit includes a correction lens, the control method comprising:

acquiring angular velocity information regarding shake detected by a plurality of detectors and acquiring a motion vector calculated from a plurality of images captured by the image sensor; and performing, by a control unit, control such that image blur of the object is suppressed by the image blur correction unit, wherein the control unit specifies the object using the motion vector and first or second angular velocity information among a plurality of pieces of the angular velocity information, wherein the first angular velocity information and the second angular velocity information are respectively detected by detectors that are respectively mounted on a camera body and an interchangeable lens that can be mounted on the camera body, wherein the control unit calculates an angular velocity of the object with respect to the image blur correction device using the second angular velocity information, and controls the image blur correction unit.

15. An image shake correction device in which blur of an image of an object captured by an image sensor through an imaging optical system is corrected by an image blur correction unit includes a correction lens, the image blur correction device comprising:

a memory;

at least one processor configured to perform a following function in accordance with a program stored in the memory;

an acquisition unit configured to acquire angular velocity information regarding shake detected by a plurality of detectors and acquire a motion vector calculated from a plurality of images captured by the image sensor; and a control unit configured to perform control such that image blur of the object is suppressed by the image blur correction unit, wherein the control unit specifies the object using the motion vector and first or second angular velocity information among a plurality of pieces of the angular velocity information, calculates an angular velocity of the object with respect to the image blur correction device using the second angular velocity information, and controls the image blur correction unit, wherein the control unit generates a frequency distribution from the acquired motion vector and specifies the object using the generated frequency distribution and the first angular velocity information.

* * * * *